June 29, 1965 F. D. DUFFEY ETAL 3,192,357
METHOD AND APPARATUS FOR ELECTRIC WELDING
Filed Oct. 23, 1962 2 Sheets-Sheet 1

INVENTORS
FRANCIS D. DUFFEY
& RICHARD P. FLANNAGAN
BY
Shoemaker and Mattare
ATTORNEYS

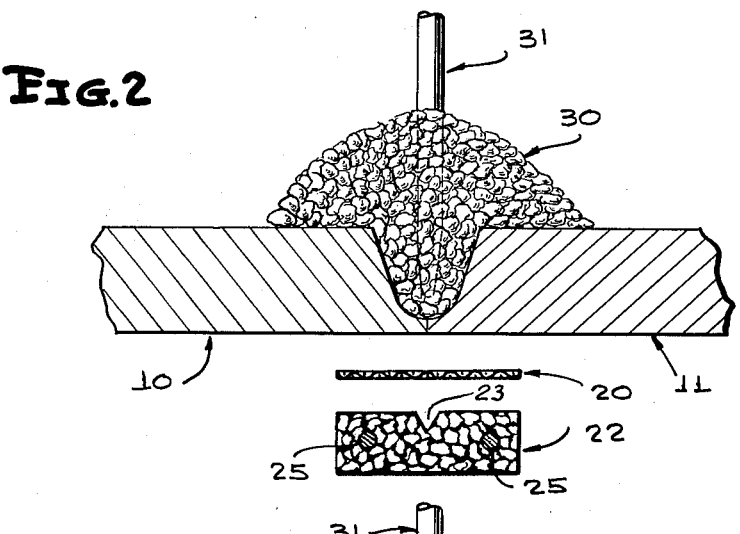
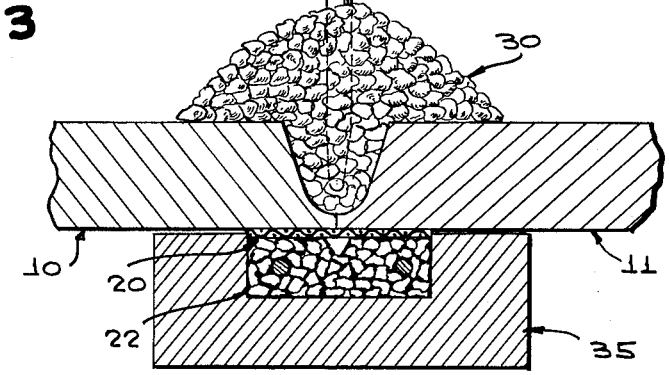
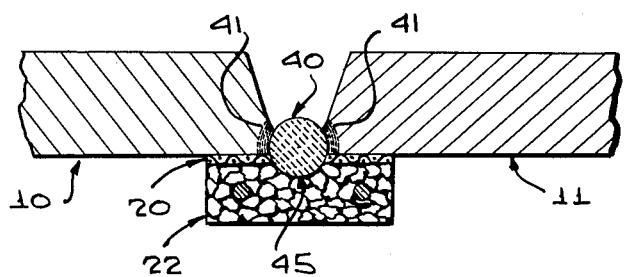

United States Patent Office 3,192,357
Patented June 29, 1965

3,192,357
METHOD AND APPARATUS FOR ELECTRIC WELDING
Francis D. Duffey, Hampton, and Richard P. Flannagan, Newport News, Va., assignors to Newport News Shipbuilding and Dry Dock Company, Newport News, Va., a corporation of Virginia
Filed Oct. 23, 1962, Ser. No. 232,464
1 Claim. (Cl. 219—73)

The present invention relates to new and novel method and apparatus for electric welding, and more particularly to a method and apparatus wherein it is desired to weld a butt joint from only one side of a pair of workpieces.

In many applications it is necessary or desirable for one reason or another to complete a welded butt joint from only one side of the members to be welded. In this situation, it is necessary to provide some means as a back-up or support during the first pass when the metal is in a molten state so that fusion may take place.

The back-up means or support utilized in prior art welding processes has assumed a number of different forms dependent upon the particular problems involved and the objectives to be obtained. In tungsten arc type welding operations, only a low degree of support is necessary, but on the other hand for submerged arc and automatic metal inert gas welding processes, the degree of support necessary for the root pass is much greater, and the backing means must have a substantial degree of rigidity. The present invention is particularly concerned with providing a rigid type backing means as is commonly employed with the latter types of processes.

The back-up means as employed in the last-mentioned types of welding processes serves a number of useful purposes. Firstly, the back-up means actually serves as a physical support for the molten metal to prevent it from dropping through and to help shape the bead formed on the under side or the reverse side of the workpieces as opposed to the top side or front side of the workpieces on which the electrode is disposed.

Secondly, the back-up means serves to a certain extent to aid in aligning the butting edges of the workpieces. Thirdly, the back-up means serves to shield the weld area from atmosphere or air, and in fact preferably produces an inert or reducing gaseous atmosphere adjacent to the weld area.

While the invention may be employed with various other types of welding processes, it is specifically shown and described as employed in the submerged arc type process.

It has been a common practice in the prior art to employ metallic backing strips to the under side of the weld seam to support the molten metal, such backing strips being commonly formed of copper or steel and held in position by clamping or tack welding. This type of arrangement has proved unsatisfactory since it detrimentally affects the weld metal and consequently the quality of the completed weld.

In an effort to overcome the disadvantages inherent in the use of metallic backing strips, various other arrangements have been proposed. For example, in U.S. Patent No. 2,145,009, a relatively thick body of granular refractory material is held in place by a metallic trough. A further solution was offered in U.S. Patent No. 2,331,937 which proposes the use of granular welding composition held in place and enclosed by a flexible fabric casing. None of these solutions have proved to be completely successful from a commercial standpoint, and the present invention incorporates a completely different concept which does afford a practical and commercially feasible solution.

The backing means as employed in the prior art has failed to combine the most desirable features of a back-up means. For example, when employing a metallic backing strip, the strip does provide the degree of support required, but on the other hand fails to achieve the desired shielding atmosphere. The employment of loose granular flux material will provide the shielding atmosphere, but fails to provide the high degree of support for the weld pool.

In the present invention, a new and novel method is provided for making a unique back-up body means as employed in the invention. The novel method of welding of the present invention utilizes this novel back-up body means in order to accomplish superior results. The back-up body means of the present invention is a rigid cast body formed of particles of flux as is utilized in the submerged arc type welding process, these particles of flux being bonded together to form a monolithic back-up means by an inorganic binder. The body means is self-supporting and relatively rigid, and the particles of flux and the binder are mixed in certain critical proportions so as to provide the desired end results. The back-up body means is preferably provided with reinforcing means therein, and is further provided with a groove in the surface thereof to be positioned adjacent the workpieces to assist in shaping the bead of the weld.

This back-up body means is utilized in combination with a strip or layer of flexible non-metallic fibrous material which is interposed between the body means and the workpieces.

The novel back-up means of the present invention including the back-up body means and the strip or layer of material eliminates the disadvantages encountered with the prior art arrangements. This novel combination of the present invention serves to provide the desired shielding atmosphere due to the inherent characteristics of the granular flux employed in the back-up body means as well as the strip or layer of material which assists in providing an atmosphere excluding shield. Furthermore, the rigidity and strength of the back-up body means serves to provide the high degree of support required in this type of welding. It is accordingly apparent that the arrangement of the present invention incorporates all of the desirable features in a most simple and effective arrangement.

An object of the invention is to provide a new and novel method and apparatus for electric welding which is particularly adapted for welding butt joints from only one side of the workpieces.

Another object of the invention is the provision of a method of electric welding employing a novel back-up means.

A further object of the invention is to provide a method of electric welding which eliminates the disadvantages encountered with prior art methods employing conventional back-up means.

Still another object of the invention is to provide a novel method of making a back-up body means.

A still further object of the invention is to provide a unique back-up means which provides the desired shielding atmosphere and which at the same time also provides the desired high degree of support for the weld metal.

Other objects and many attendant advantages of the invention will become more apparent when considered in connection with the specification and accompanying drawings, wherein:

FIG. 2 is a section taken through the components illustrated in FIG. 1;

FIG. 3 is a section similar to that of FIG. 2 with the components in assembled cooperative contacting relationship with one another; and FIG. 4 is a section similar to FIG. 3 illustrating the formation of the weld after making the first pass and particularly illustrating the maner in which the bead on the under surface of the weld is shaped.

Figure 1:
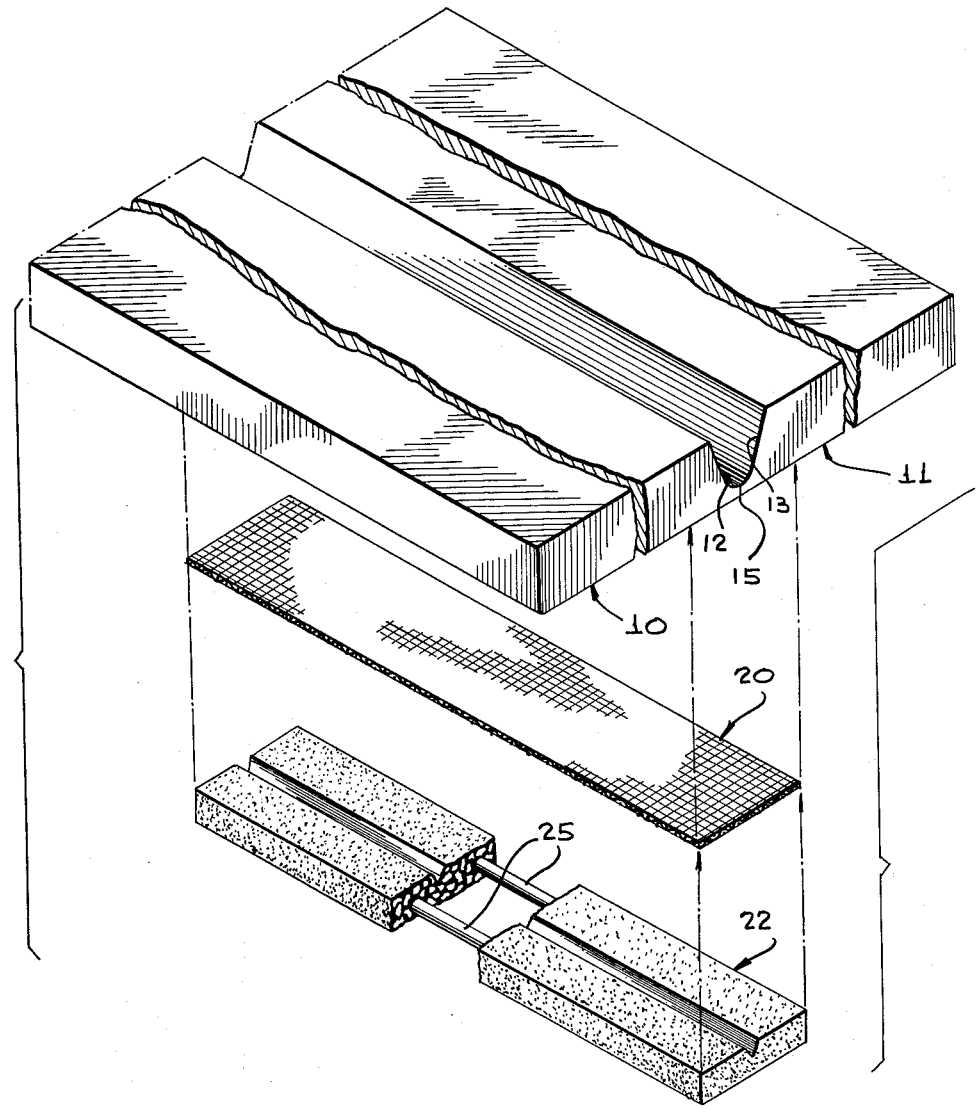
FIG. 1 is an exploded perspective view partly broken away illustrating the interrelationship of the components employed in the present invention.

Referring now to the drawings wherein like reference characters designate corresponding parts throughout the several views, there is shown in FIG. 1 a pair of workpieces indicated generally by reference numberals 10 and 11, these workpieces being of a suitable metallic material, and it being desired to complete a welded butt joint along the edges of the workpieces from only the upper side thereof as viewed in this figure. These workpieces are provided with conventional weld preparations 12 and 13 which cooperate to form a trough as is conventional in the art, the butting edges of the two workpieces forming a seam 15 extending longitudinally thereof.

It will be understood that the workpiece may extend a considerable distance beyond that shown, and that the portion shown is for illustrative purposes only.

A strip of material is indicated generally by reference numeral 20, this strip of material having certain important characteristics as will be hereinafter more fully discussed. A back-up body means is indicated generally by reference numeral 22, and the construction and composition of this back-up body means will be more clearly understood in accordance with the discussion of the method of manufacture thereof which follows hereinafter.

In making the back-up body means 22, there is firstly provided non-fused particles of a welding composition or flux as utilized for example in the submerged arc welding process. The flux may be of a composition for example as disclosed in U.S. Patent No. 2,150,625. As a practical matter, any flux which is suitable for use in the submerged arc welding process is usable in the present invention. The particles of flux are fine mesh size particles identified as 12–150 size. The size of the particles may vary slightly from the specific sizes mentioned above, but these are considered desirable for the purposes of the present invention. Flux particles as discussed above are characterized by the fact that they melt at approximately the arc temperature, and further provide a scavenging action which picks up impurity from the metal as well as providing a suitable atmosphere for the welding operation.

There is also provided for forming the back-up body means a suitable adhesive binder. This binder must be of an inorganic nature, and a typical suitable example is anhydrous sodium silicate. The particles of flux and the binder are then mixed in certain critical proportions. The flux particles must be in a range of approximately 92 percent to 98 percent by volume of the mixture while the inorganic binder must be in a range of approximately 2 percent to 8 percent by volume of the mixture.

The mixture is then mulled or similarly processed to remove lumps therefrom.

The mold is provided of any desired configuration, and as will be seen in FIG. 1, the mold in this case will have a cross-sectional configuration which is substantially rectangular with suitable means being provided for forming an elongated substantially V-shaped groove 23 in the top surface of the body means. The mixture of the flux particles and the binder is then put into the mold and preferably tamped in under pressure.

It will also be understood that the mixture of the flux particles and binder may also be cast in place as desired. When cast in sections, the back-up body means may be molded to fit any contour, and may also incorporate suitable end connection designs and provide the proper groove for welding.

In order to reinforce and rigidify the back-up body means and to ensure that it will be self-supporting under the loads impressed thereon, a reinforcing means may be provided in the form of elongated steel rods indicated by reference numeral 25 in FIG. 1. It will be understood that these rods are cast in the material of the back-up body means and may be suitably supported in the mold at the time of casting.

The molded or cast-in-place mixture is then hardened by the use of dry carbon dioxide gas which removes the water from the solution. The carbon dioxide gas is suitably brought into contact with the body means for a sufficient time as required to remove the desired amount of water.

The back-up body means may be then further hardened by baking at approximately 250° F. for a suitable period of time. The result is a relatively rigid monolithic body which is self-supporting and which is adapted to withstand moderate clamping pressures as may be encountered in practical applications. For example, a cast back-up means according to the present invention has been tested and shown to maintain its shape with a load of 8400 pounds on a 1" by 6" by ⅜" section. The strip of material 20 is interposed between the back-up body means 22 and the under surface of the workpieces 10 and 11. This strip of material is designed to serve several different functions. Firstly, it serves as an atmosphere excluding shield. Secondly, it serves as a sort of cushion means to prevent breakage of the back-up body means 22 when it is subjected to the clamping pressures employed in practice. Thirdly, the strip of material 20 is designed to be of low thermal conductivity such that it slows down the metal impingement on the back-up body means 22 and serves to provide improved results in the finished bead.

As a result of the desired characteristics of the strip of material 20, it must be of a particular construction. The material must be of a flexible nonmetallic fibrous construction, and must be of such a nature as not to give off harmful or deleterious gases at temperatures to which the material is subjected during the welding process. A particularly successful substance for use in strip 20 has been found to be woven fiberglass tape of approximately 5/1000 to 10/1000 of an inch in thickness. Of course, the thickness of the material may vary according to the particular application, and other types of materials may also be suitable for use in strip 20. For example, asbestos fibers and other materials known as "rock wool" and substances having similar characteristics may be employed in strip 20.

Referring now to FIG. 2, a body of loose particles of flux is indicated generally by reference numeral 30, this body normally being referred to as a burden or blanket. It will be noted that the burden is simply piled up on the upper surface of the workpieces and fills the trough between the workpieces and extends thereabove. A conventional electrode is indicated by reference numeral 31, this electrode being of the usual type employed in electric welding processes, the electrode extending down within the trough to a point adjacent the seam between the workpieces as is conventional.

Referring now to FIG. 3, the components are illustrated in operative position for carrying out the welding procedure. A metallic block 35 is utilized for clamping the back-up body means 22 and strip 20 in operative position. Member 35 is provided with a groove extending longitudinally thereof which receives the back-up body means 22, and if desired, the groove may be slightly shallower than the back-up body means to ensure that when pressure is applied to member 35, a very tight contacting engagement will be provided between the underside of the workpieces and the strip 20 which will be compressed between the workpieces and the back-up body means. It will be understood that member 35 is provided for the purpose of enabling pressure to be readily applied to the back-up means of the invention. After the back-up means has been firmly clamped in position as illustrated in FIG. 3, the operator strikes a welding arc between the metal electrode 31 and the workpieces. The electrode then is moved along the seam in the usual manner to complete the weld.

As seen in FIG. 4, the reference numeral 40 indicates the portion of the weld as formed on the first pass of the electrode. Reference numerals 41 indicate portions of the metal of the workpieces which have been fused with the material of the electrode, and particular attention is drawn to the under surface 45 of the bead of the weld. It will be noted that this under surface 45 has assumed a substantially arcuate configuration. This type of configuration is very desirable, and is rendered so due to the provision of the substantially V-shaped groove provided in the upper surface of the back-up body means 22.

It is, of course, evident that the shape of the under surface 45 of the bead is a function of the quality and characteristics of the rigid-back-up body 22 which does have sufficient strength to support the molten metal and to cause it to form into the shape shown. The strip 20 also cooperates by functioning as previously discussed to assit in providing the desired finished configuration and characteristic of the weld.

It should also be noted that the configuration of the groove provided in the upper surface of the back-up body means as illustrated in the drawings may be of any suitable configuration and may also be U-shaped as well as V-shaped as illustrated.

It is apparent that as seen in FIG. 4, the local area of the flux of the back-up body means 22 is fused to the molten metal in producing the weld.

It is apparent from the foregoing that there is provided a new and novel method and apparatus for electric welding which is especially adapted for welding butt joints from only one side of a pair of workpieces. The method of the present invention employs a novel back-up means and eliminates disadvantages encountered with prior art methods employing conventional back-up means. A novel method of making the back-up body means of the present invention is also provided. The unique back-up means of the present invention provides not only the desired shielding atmosphere, but also further provides a high degree of mechanical support for the molten metal so as to cause the weld to be shaped in the desired manner.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by the claim.

We claim:

The method of butt welding a pair of workpieces comprising providing a metallic block with a groove extending longitudinally thereof and providing a back-up body means retained within said block, said back-up body means comprising a rigid monolithic self-supporting structure formed of particles of flux and an inorganic binder, said particles being in the range of 92% to 98% by volume of the body means, and the binder being in the range of 2% to 8% by volume of the body means, elongated rigid support means positioned within said body means and extending longitudinally thereof, a V-shaped groove being provided in the upper surface of said body means and extending longitudinally thereof, further providing a woven fiberglass tape of a width comparable to that of the body means and extending the length thereof, positioning said strip over the surface of said body means which contains said V-shaped groove, positioning a pair of workpieces over said strip with the abutting edges above said groove in said body means, providing a blanket of loose particles of flux over the edges of said workpieces to be welded and then submerging an electrode into said burden adjacent the edges of said workpieces and striking a welding arc between said electrode and said workpieces and passing the electrode along the said edges.

References Cited by the Examiner

UNITED STATES PATENTS

| | | | |
|---|---|---|---|
| 1,990,077 | 2/35 | Kershaw | 113—112 |
| 1,596,482 | 8/26 | Ewen | 264—271 |
| 2,145,009 | 1/39 | Keir | 219—73 |
| 2,257,737 | 10/41 | Field | 264—299 |
| 2,294,439 | 9/42 | Bagley | 29—365 |
| 2,331,937 | 10/43 | Schreiner | 219—73 |
| 2,362,505 | 11/44 | Smith | 113—111 |
| 2,623,148 | 12/52 | Ronay | 219—137 |

FOREIGN PATENTS

| | | |
|---|---|---|
| 803,146 | 10/58 | Great Britain. |
| 846,048 | 8/60 | Great Britain. |

RICHARD M. WOOD, *Primary Examiner.*